United States Patent [19]

Wilkie et al.

[11] Patent Number: 4,926,319
[45] Date of Patent: May 15, 1990

[54] INTEGRATED CIRCUIT TIMER WITH MULTIPLE CHANNELS AND DEDICATED SERVICE PROCESSOR

[75] Inventors: Brian F. Wilkie; Vernon B. Goler, both of Austin; Stanley E. Groves, Round Rock; John J. Vaglica, Austin, all of Tex.

[73] Assignee: Motorola Inc., Schaumburg, Ill.

[21] Appl. No.: 234,104

[22] Filed: Aug. 19, 1988

[51] Int. Cl.⁵ .............................................. G06F 1/04
[52] U.S. Cl. ............................... 364/200; 364/232.7; 364/232.8; 364/270
[58] Field of Search ............................... 364/200, 900

[56] References Cited

U.S. PATENT DOCUMENTS 4,220,990  9/1980  Alles ...................................... 364/200

Primary Examiner—Raulfe B. Zache
Attorney, Agent, or Firm—Jonathan P. Meyer

[57] ABSTRACT

A timer system comprises multiple channels, each of which is capable of performing input and output timer functions referenced to any of a plurality of timer reference signals. In the preferred embodiment, sixteen independent channels are serviced by a processor dedicated to that purpose and each can perform capture and match functions referenced to either of two free-running counters.

18 Claims, 9 Drawing Sheets

FIG. 2A

| FC ADDRESS | WORD: BYTE N (15–8) | BYTE N+1 (7–0) |
|---|---|---|
| 101 YFFE00 | MODULE CONFIGURATION REGISTER | |
| 101 YFFE02 | MODULE TEST REGISTER | |
| 101 YFFE04 | 0 0 0 0 0 | DEVELOPMENT SUPPORT CTL. REG. |
| 101 YFFE06 | READS AS ZEROS | DEV. SUP. STAT. 0 0 0 |
| 101 YFFE08 | 0 0 0 0 0 INTERRUPT REGISTER | 0 0 0 0 |
| 101 YFFE0A | PHASE INTERRUPT ENABLE REGISTER | |
| 101 YFFE0C | CHANNEL PRIMITIVE SELECT REGISTER 1 | |
| 101 YFFE0E | CHANNEL PRIMITIVE SELECT REGISTER 2 | |
| 101 YFFE10 | CHANNEL PRIMITIVE SELECT REGISTER 3 | |
| 101 YFFE12 | CHANNEL PRIMITIVE SELECT REGISTER 4 | |
| X01 YFFE14 | HOST SEQUENCE REGISTER 1 | |
| X01 YFFE16 | HOST SEQUENCE REGISTER 2 | |
| X01 YFFE18 | HOST SERVICE REQUEST REGISTER 1 | |
| X01 YFFE1A | HOST SERVICE REQUEST REGISTER 2 | |
| 101 YFFE1C | CHANNEL PRIORITY REGISTER 1 | |
| 101 YFFE1E | CHANNEL PRIORITY REGISTER 2 | |
| 101 YFFE20 | PHASE INTERRUPT STATUS REGISTER | |
| 101 YFFE22 | LINK REGISTER | |
| 101 YFFE24 | SERVICE GRANT LATCH REGISTER | |
| 101 YFFE26 | DECODED CHANNEL NUMBER REGISTER | |

FROM FIG. 2A

| Address | | |
|---|---|---|
| 101 YFFE28 / 101 YFFEFE | UNUSED ADDRESS SPACE THESE LOCATIONS READ AS $0000 | |
| X01 YFFF00 / X01 YFFF0A | CHANNEL 0 | PARAMETERS 0 – 5 |
| X01 YFFF0C / X01 YFFF0E | UNUSED ADDRESS SPACE 2 WORDS WHICH READ AS $0000 | |
| X01 YFFF10 / X01 YFFF1A | CHANNEL 1 | PARAMETERS 0 – 5 |
| X01 YFFF1C / X01 YFFF1E | UNUSED ADDRESS SPACE 2 WORDS WHICH READ AS $0000 | |
| ⋮ | ⋮ | ⋮ |
| | CHANNEL 14 | PARAMETERS 0 – 5 |
| | UNUSED ADDRESS SPACE 2 WORDS WHICH READ $0000 | |
| X01 YFFFF0 / X01 YFFFFA | CHANNEL 15 | PARAMETERS 0 – 5 |
| X01 YFFFFC / X01 YFFFFE | UNUSED ADDRESS SPACE 2 WORDS WHICH READ AS $0000 | |

$X$ = Depends on the state of the SUPV bit in module configuration register.
$Y$ = m111 where m is the modmap bit in the module configuration register of the system integration module. ($Y$ = $7 or $F)

| FIG. 4A |
|---|
| FIG. 4C | FIG. 4B |
| | FIG. 4D |

FIG. 4E

INTEGRATED CIRCUIT TIMER WITH MULTIPLE CHANNELS AND DEDICATED SERVICE PROCESSOR

REFERENCE TO RELATED APPLICATIONS

The present application is related to the following U.S. patent applications, which are all filed of even date herewith:

Ser. No. 07/233,789, titled "Dedicated Service Processor with Inter-Channel Communication Features";

Ser. No. 07/234,111, titled "Timer Channel with Match Recognition Features";

Ser. No. 07/234,102, titled "Processor with Flexible Return from Subroutine";

Ser. No. 07/234,103, titled "Timer Channel with Multiple Timer Reference Features"; and Ser. No. 07/234,110, titled "Timer Channel for use in a Multiple Channel Timer".

FIELD OF THE INVENTION

The present invention relates, in general, to an integrated circuit timer with multiple channels. More particularly, the invention relates to a general purpose, autonomous timer subsystem which has multiple timer channels and in which all timer channels have equivalent functionality.

BACKGROUND OF THE INVENTION

Timer subsystems for use with microcomputers are well known in the art, both as integrated and as stand-alone units. In every case, prior art timer subsystems reflect a manufacturer's attempt to manage the trade-offs between increased size of an integrated circuit and the maximum possible functionality.

An illustrative example is the MC68HC11A8 microcomputer available from Motorola, Inc. of Austin, Texas. This sophisticated 8-bit microcomputer has an integrated programmable timer subsystem which can perform up to three independent input (capture) functions and five independent output (match) functions, all of which are referenced to a single timer reference signal derived from a free-running counter. However, if a customer needs four captures and only one match, or a match and capture referenced to different references, this device will not be adequate.

Another example is the 8096 microcomputer available from Intel Corp. of Santa Clara, California. This is a very sophisticated 16-bit microcomputer which includes a timer subsystem. The timer has two separate counters to which events may be referenced, one of which is clocked internally and one of which may be externally clocked. Four input lines are available and may be used to perform as many as eight capture functions, but all capture functions must be related to the first of the two counters. Similarly, six output lines are available and each may perform an independent match function referenced to either of the counters. However, two of the six output pins are shared with the input functions, making them available only for one or the other function, but not for both.

Another common feature of prior art integrated circuit timers is their dependence on a host CPU for initialization, configuration and response to timer-related interrupts. For example, in the MC68HC11A8 mentioned above, the CPU of the microcomputer is solely responsible for servicing the needs of the timer subsystem. For instance, if a capture event occurs from upon the results of which a subsequent match function is to be based, the host CPU must read the captured timer value, perform any necessary calculations, and set up the match event. At some point, the demands of the timer subsystem overwhelm the capacity of the CPU and exclude the performance of any other functions.

SUMMARY OF THE INVENTION

Accordingly, it is an object of the present invention to provide an improved timer subsystem for use with a microcomputer.

A further object of the present invention is to provide a multiple channel timer subsystem with fully orthogonal channels.

Still a further object of the present invention is to provide a multiple channel, multiple counter timer subsystem with fully orthogonal channels.

Yet a further object of the present invention is to provide a multiple channel timer subsystem with a dedicated service processor.

These and other objects and advantages of the present invention are provided by an integrated circuit timer comprising: timer reference signal generating means for producing at least two timer reference signals; and a plurality of timer channels, each of said timer channels being identical and each comprising: input means for performing an input function, said input means being responsive to any of said at least two timer reference signals; and output means for performing an output function, said output means being responsive to any of said at least two timer reference signals.

These and other objects and advantages of the present invention will be apparent from the detailed description below taken together with the drawings.

BRIEF DESCRIPTION OF THE DRAWINGS

FIGS. 2A–2B form a diagram illustrating the memory map of a timer which comprises the preferred embodiment of the present invention;

FIG. 4E illustrates the inter-relationships of FIGS. 4A–4D;

DESCRIPTION OF THE PREFERRED EMBODIMENT

The terms "assert" and "negate", and various grammatical forms thereof, are used herein to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Figure 1:
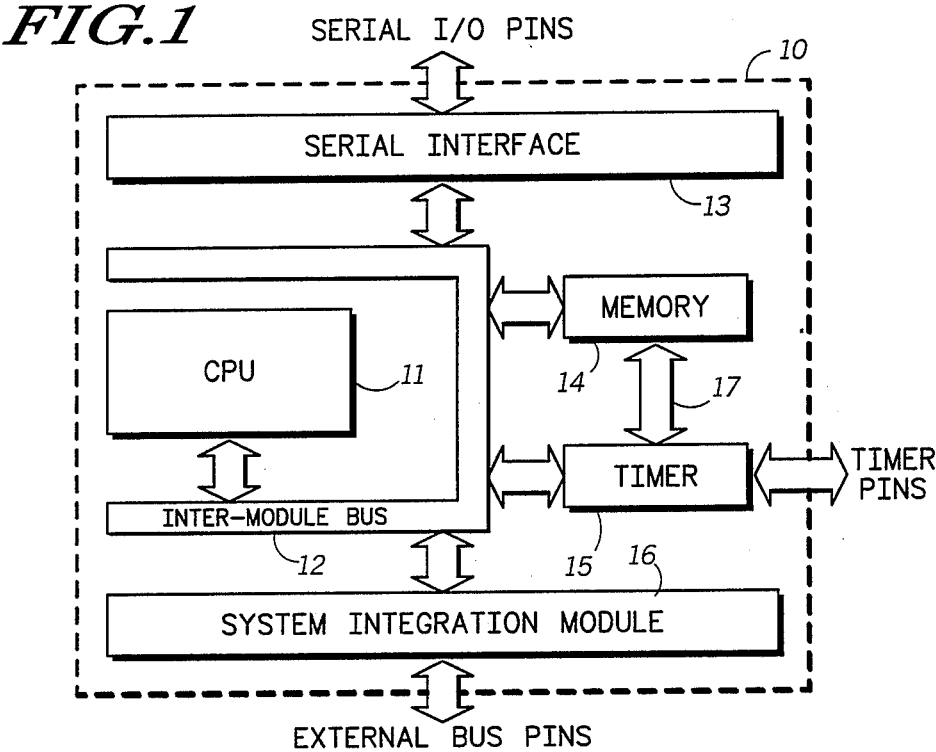
FIG. 1 is a block diagram of a single-chip microcomputer of which the preferred embodiment of the present invention is a part.

FIG. 1 illustrates a microcomputer of which a preferred embodiment of the present invention is a part. Microcomputer 10, which is intended for manufacture as a single integrated circuit, comprises a central processing unit (CPU) 11, an inter-module bus (IMB) 12, a serial interface 13, a memory module 14, a timer 15 and a system integration module (SIM) 16. Each of CPU 11, serial interface 13, memory 14, timer 15 and SIM 16 is bi-directionally coupled to IMB 12 for the purpose of exchanging address, data and control information. In addition, timer 15 is bi-directionally coupled to memory 14 by means of an emulation bus 17, the purpose of which will be more clear from the discussion below.

Serial interface 13 and timer 15 are each coupled to a number of pins, or connectors, for communication with devices external to microcomputer 10. In addition, SIM 16 is coupled to a number of pins comprising an external bus.

Timer 15, which comprises the preferred embodiment of the present invention, is a relatively autonomous module. The purpose of timer 15 is to perform all of the timing tasks required of microcomputer 10 with as little intervention by CPU 11 as possible. Examples of timing tasks which may be required of microcomputer 10 include ignition and fuel injection timing in an automobile engine, shutter timing in an electronic camera and the like. While this preferred embodiment of the present invention places timer 15 in the context of a microcomputer, the principles described may be readily applied to other contexts, including that of a stand-alone timer module.

Timer 15 is capable of referencing two clock sources. Both clock sources take the form of free-running counter registers, referred to as timer count register #1 (TCR1) and timer count register #2 (TCR2), respectively. TCR1 is clocked by an internal clock source related to the system clock of microcomputer 10. TCR2 is clocked either by an external source which is supplied to microcomputer 10 by means of a pin, or by the internal source as gated by the signal appearing on the external source pin.

In this preferred embodiment, timer 15 has sixteen timer "channels", each having its own pin. Two basic types of timer events are cognizable by the system of the preferred embodiment: match events and capture events. Match events are fundamentally output functions and capture events are fundamentally input functions. A match event occurs when the count in one of the two timer count registers bears a predetermined relationship to a value stored in a register in a selected one of the timer channels. A capture event occurs when a pre-defined transition is detected at the pin associated with one of the timer channels, triggering the "capture" of the instantaneous count of one of the timer count registers into a register in that timer channel. Further details of the functions of the various timer channels are contained in the description below.

CPU 11 is occasionally referred to as the "host" CPU. In this context, timer 15 operates subject to the control of CPU 11, upon which it depends for certain initialization and other functions. Although the host CPU is resident on the same integrated circuit as is timer 15 in this preferred embodiment, this is not required in order to implement the principles of the present invention.

Certain of the features of timer 15 will be clearly understood only with reference to the details of the signals and functions of IMB 12. Therefore, the following table summarizes those features of IMB 12. IMB 12 is similar in many ways to the busses of familiar microprocessors and microcomputers available from the assignee of the present invention and may best be understood in that context. Signal directions in the table are defined with respect to their function within timer 15.

| SIGNAL NAME | MNE-MONIC | FUNCTION | DIRECTION |
|---|---|---|---|
| Address bus | ADDR0-ADDR23 | 24 bit address bus | input |
| Data Bus | DATA0-DATA15 | 16 bit data bus with bus sizing | input/output |
| Function Code | FC0-FC2 | Identifies CPU state and address space | input |
| Module Map | MODMAP | Indicates placement of module registers within memory map of CPU | input |
| Clock | CLOCK | Master system clock | input |
| Cycle Start | CYS | Indicates start of IMB cycle | input |
| Address Strobe | AS | Indicates valid address | input |
| Data Strobe | DS | Indicates valid data on write cycle | input |
| Read/Write | WRITE | Indicates type of bus cycle relative to master | input |
| Transfer Size | SIZ0-SIZ1 | Number of bytes left to be transferred | input |
| Address Acknowledge | AACK | Asserted by selected slave module | output |
| Data Transfer Acknowledge | DTACK | Slave response which terminates bus cycle | output |
| Bus Error | BERR | Terminates bus cycle if no valid reponse rec'd | input |
| Relinquish and Retry | RRT | Breaks bus mastership standoff | input |
| Retry | RETRY | Terminates bus cycle and causes cycle to be re-run | * |
| Halt | HALT | Indicates CPU halt due to abnormal condition | * |
| Breakpoint Request | BKPT | Requests CPU to insert breakpoint on current bus cycle | output |
| Breakpoint acknowledge | FREEZE | CPU acknowledgement of debug mode entry | input |
| System Reset | SYSRST | "Soft" reset of system under CPU control | input |
| Master Reset | MSTRST | "Hard" reset under external control | input |
| Interrupt Request Level | IRQ1-IRQ7 | Prioritized interrupt requests to CPU | input |
| Interrupt Arbitration | IARB0-IARB1 | Interrupt arbitration identification lines | input/output |
| Autovector | AVEC | Enables autovector feature during interrupt acknowledge cycle | * |
| Bus Request | BR0-BR8 | Prioritized bus mastership arbitration signals | * |
| Bus Lock | BLOCK | Allows current bus master to retain bus | * |
| Test Mode | TSTMOD | Enables test mode in all modules | input |
| Enable IMB test lines | IMBTEST | Toggles function of IRQ1-IRQ7 to test lines | input |

Those IMB signals marked with an asterisk in the "DIRECTION" column are not used by timer 15. As is described below, timer 15 has a slave-only interface to IMB 12 and, therefore, does not require the use of certain signals.

Certain other features of microcomputer 10 are the subject of copending U.S. patent application Ser. No. 115,479. The invention claimed therein is unrelated to the present invention except through the common context of the preferred embodiments.

Timer 15 exists, from the viewpoint of CPU 11, as a number of locations in the memory map of CPU 11. That is, CPU 11 interacts with timer 15 primarily, although not exclusively, by reading and writing the timer registers located at these memory locations. FIGS. 2A–2B illustrate the locations and names of the timer registers. The addresses are in hexadecimal form and the function code bits are specified in binary form. While some of these registers may be described in greater detail below, the following description will summarize the function of each. It should be noted that the brief description below is from the point of view of the host CPU. Access to the various timer registers by timer 15 may not follow the description below. Where relevant to the present invention, these details will be described later.

The module configuration register, which exists exclusively in the supervisor address space of CPU 11 (as indicated by the function code bits 101), contains six bit fields which specify certain attributes of timer 15. These attributes are: the interrupt arbitration ID, the supervisor/user address space location of certain other registers, a stop condition flag, a stop control bit, a TCR2 source control bit, an emulation mode control bit, a TCR1 pre-scaler control bit, and a TCR2 pre-scaler control bit.

The module test register contains bit fields which control aspects of a test mode of timer 15 which are not relevant to the present invention.

The development support control register contains a number of bit fields which determine the interaction of timer 15 with the development support features of CPU 11. Similarly, the development support status register relates only to the status of timer 15 with respect to those development support features. These features are not relevant to the present invention. More detail on the development support features of CPU 11 may be found in the above-mentioned U.S. patent application Ser. No. 115,479.

The interrupt register contains two bit fields which determine two features of interrupts generated by timer 15 to CPU 11. One field specifies the most significant four bits of the interrupt vector for all interrupts generated by timer 15. The other bit field specifies a priority level for all interrupts generated by timer 15. It is possible to set this bit field to disable all interrupts from timer 15, to set the bit field so that interrupts from timer 15 are at the highest level of priority with respect to CPU 11 (i.e., a non-maskable interrupt), and to set this bit field to various levels between these two extremes. As is familiar, the interrupt priority is used by CPU 11 to determine the relative priority of timer interrupts with respect to other interrupt sources.

The phase interrupt enable register contains 16 one-bit fields, one field corresponding to each of the sixteen "channels" of timer 15. Each bit field enables or disables, depending on its state, the generation of interrupts by the service processor of timer 15 (see the discussion of FIG. 3, below) while servicing the channel associated with that bit field.

The four channel primitive select registers contain sixteen four-bit fields which determine which of sixteen possible primitives, or timer programs, are to be executed by the service processor within timer 15 when it is servicing a particular channel. Each of the sixteen bit fields is associated with one of the sixteen timer channels. The four bits in a field are used as a portion of an address which is supplied to a control store within the service processor when the processor begins to service the channel associated with that field. The data returned by the control store in response to that address is used as an entry point, or starting address, for the primitive to be executed while servicing that channel. The control store of the service processor may contain as many as sixteen different primitives and as many as 16 entry points for each of the sixteen channels (for a total of 256 entry points). The total size of the control store is fixed, but the allocation between primitive code and entry points may vary. That is, it is possible to use less than all of the 256 entry point locations and use the "excess" storage capacity to contain more primitive code.

The two host sequence registers may reside in either the supervisor or the non-restricted address spaces of CPU 11, depending on one of the bit fields in the module configuration register. This is indicated by the function code bits X01, where X depends on the SUPV bit in the module configuration register. The host sequence registers contain sixteen two-bit fields, one for each of the sixteen timer channels. The host sequence bit fields are available for use by, but are not necessarily used by, a primitive executing on the service processor as branch conditions. That is, it is possible to alter the instruction flow within a primitive dependent on the states of the two host sequence bits.

The two host service request registers contain sixteen two-bit fields, one for each timer channel. By writing to the appropriate bit field, the host CPU can schedule any of the timer channels for service by the service processor of timer 15. Since each channel has two bits in one of the host service request registers, there are four possible values per channel. There are three different "types" of service which may be requested for each channel, corresponding to three of the four possible values. The fourth value indicates that no host-requested service is to be scheduled. The three values indicating a host-initiated service request are used in a fashion similar to the primitive select bits described above. The host service request bits are not used directly to obtain the entry point address, but are encoded together with other channel condition bits.

The two channel priority registers contain sixteen two-bit fields, one for each channel. Each bit field specifies one of four possible priority levels for its associated channel. This priority level is used by a scheduler within the service processor of timer 15 to determine which of several competing channels is to receive service first. The four possible priority levels are: disabled, low, mid and high. The service scheduler allocates the resources of the service processor in such a way that even a low priority channel is guaranteed to obtain service in a determinate amount of time. Each of the channels may be assigned to any of the available priority levels and any combination of priority levels on the sixteen channels is allowable.

The phase interrupt status register contains one bit for each of the sixteen channels and is associated with the phase interrupt enable register discussed above. When the service processor determines that an interrupt should be generated while servicing a particular channel, the bit in the phase interrupt status register corresponding to that channel is asserted. If the corresponding bit of the phase interrupt enable register is asserted, an interrupt is generated. If not, the status bit remains asserted, but no interrupt is generated to the host CPU.

The link register contains one bit for each of the sixteen timer channels. Each bit indicates that a particular type of service request, a link service request, has been asserted in order to initiate service request for the corresponding channel.

The service grant latch register contains sixteen one-bit fields. Each timer channel is associated with one of these fields. When asserted, a bit in the service grant latch register indicates that the associated channel has been granted a "time slot" for service by the service processor. The bits in this register are used by the scheduler within the service processor in the course of allocating the resources of the service processor.

The decoded channel number register contains a one bit field for each timer channel which, when asserted, indicates that, when the service processor last began servicing a new channel, it was servicing the channel indicated in the decoded channel number register. This channel identity remains constant even if the primitive being executed performs a "change channel" function which alters the identity of the channel actually being controlled by the service processor.

The remainder of the memory map of timer 15, as viewed by its host CPU, comprises a number of channel parameter registers. Each of the sixteen timer channels has six parameter registers dedicated thereto. As is described in greater detail below, the parameter registers are used as a shared work space through which the host CPU and timer 15 can pass information to one another.

Figure 3:
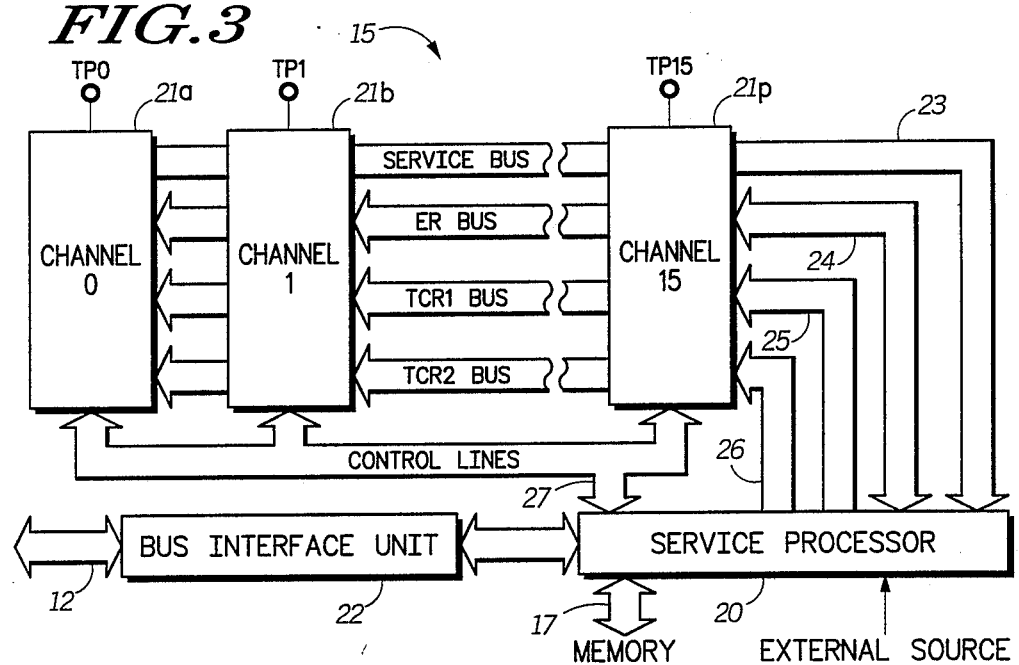
FIG. 3 is a block diagram illustrating the major components of the timer of the preferred embodiment.

FIG. 3 illustrates timer 15 in isolation from the remainder of microcomputer 10. The major functional components of timer 15 may be throught of as comprising a service processor 20, sixteen timer channels 21a–21p, also labelled CH0–CH15, and a bus interface unit (BIU) 22. Each timer channel is connected to a single pin of microcomputer 10. Channel 0 is connected to pin TP0, channel 1 is connected to pin TP1, and so forth. As is common in microcomputers, it is possible that each of these pins is "shared" between timer 15 and some other functional module of microcomputer 10, although this is not the case in the preferred embodiment described here.

The interconnections between service processor 20 and channels 21a–21p comprise a service bus 23, an event register (ER) bus 24, a timer count register #1 (TCR1) bus 25, a timer count register #2 (TCR2) bus 26 and a number of miscellaneous control and status lines 27. Service bus 23 is used by channels 21a–21p to request service of service processor 20. ER bus 24 is used to pass the contents of event registers within each channel to service processor 20 and to load these registers from service processor 20. The two TCR buses are used to communicate the current contents of two timer count registers, which are located within service processor 20, to channels 21a–21p.

BIU 22 serves as an interface between IMB 12 and service processor 20. The details of such a bus interface are not relevant to the present invention and are familiar in the art. In the preferred embodiment, BIU 22 is a "slave-only" interface. That is, timer 15 may be the recipient of information transmitted across IMB 12, but may not initiate transfers on IMB 12.

As is described in greater detail below, service processor 20 includes a control store. The control store comprises a read-only memory unit which contains the instructions which are executed by service processor 20. In the preferred embodiment, this is implemented as a mask-programmable ROM. As will be appreciated by one skilled in the art, such a control store makes the development of software to be programmed into the control store problematical. To address this problem, an emulation interface 17 couples service processor 20 to memory 14. That is, service processor 20 is capable of executing instructions stored in memory 14 instead of those contained in the control store. In the preferred embodiment, memory 14 is an alterable memory such as a random access memory (RAM). Emulation interface 17 serves the purpose of allowing a user to write, execute and modify primitives for service processor 20. Once fully debugged, these primitives could be incorporated into future versions of the control store.

An external timing source, which may form the basis for the count contained in TCR2, is coupled to service processor 20. The above-described bit in the module configuration register controls whether TCR2 is clocked by this external timing source or by the internal timing reference.

In general, service processor 20 is responsible for configuring channels 21a–21p, primarily through the use of ER bus 24 and control lines 27, to perform predetermined timing tasks. Channels 21a–21p perform these tasks as directed and, from time to time, inform service processor 20 of the occurrence of events and the like by requesting service. Service processor 20 is responsible for determining what, if any, action is to be taken in response to a service request from a particular channel and for initiating that service. Service processor 20 is, in turn, dependent on its host CPU (in this case, CPU 11) to identify the timing functions to be performed and for certain other services, as is described more fully below. Service processor 20 is also exclusively responsible for initiating interrupt requests to the host CPU. In the preferred embodiment, this function is under control of the programs resident in the control store of service processor 20.

The TCR1 and TCR2 busses are continuously available to each of the sixteen channels and are updated on a predetermined schedule with the new contents of the respective timer count registers. Similarly, each of the sixteen channels may assert a service request via service bus 23 at any time. However, with respect to ER bus 24 and control and status lines 27, service processor 20 is only in communication with a single one of the sixteen channels at any one time. Reads and writes of the event registers via ER bus 24 and the various control and status signals on control and status lines 27 are effective only with respect to that single channel then currently being serviced by service processor 20. To the extent necessary, each channel must latch the control information communicated thereto by control lines 27 to preserve it while service processor is servicing other channels.

In addition to a service request initiated by a channel via service bus 23, service processor 20 is responsive to service requests initiated by the host CPU. By writing appropriate values to the host service request registers described above, the host CPU can initiate the scheduling of service for any particular channel. Further, service processor 20 may, itself, initiate such scheduling through the link service request mechanism described in greater detail below.

Figure 4A:
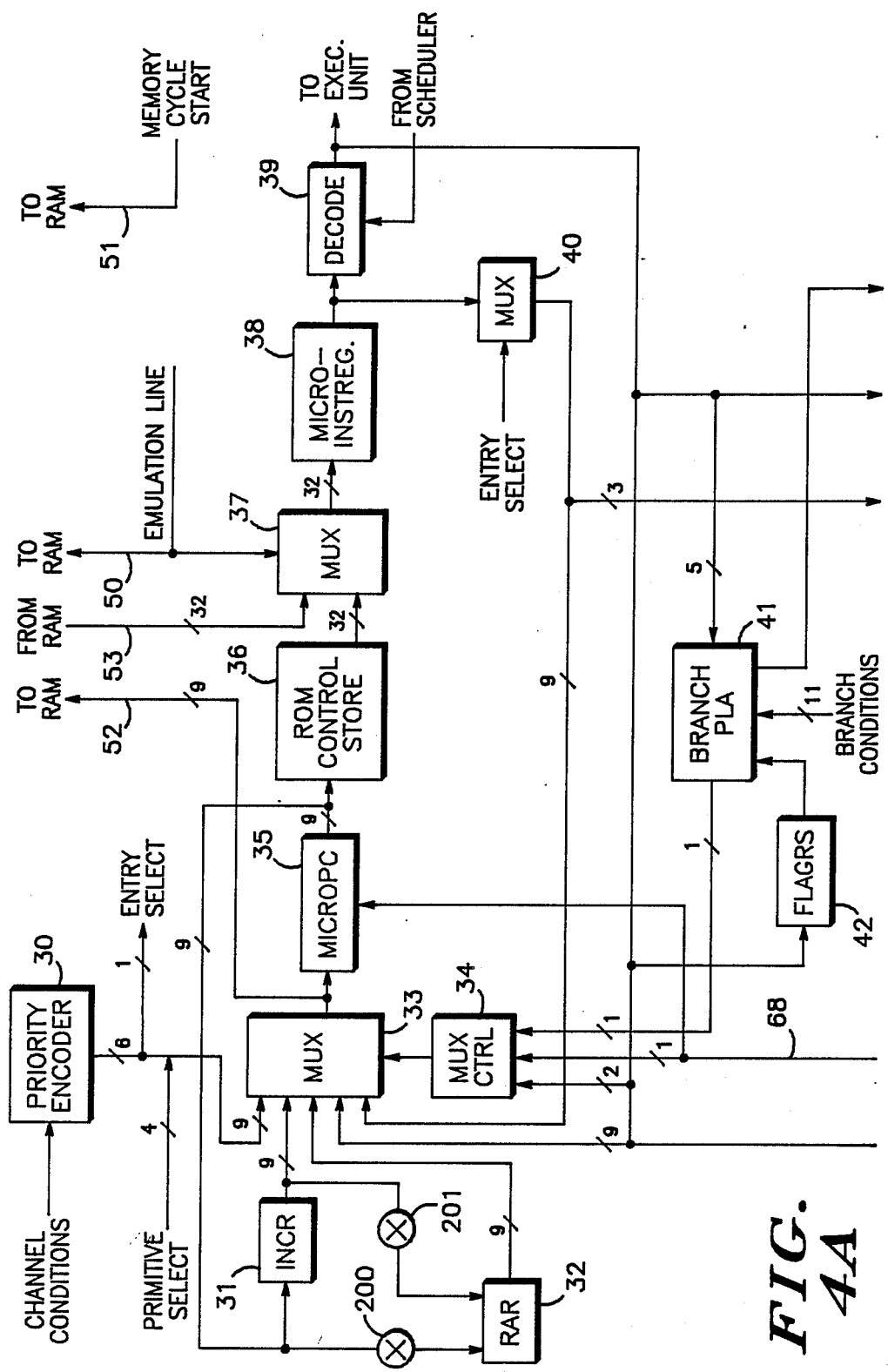
FIGS. 4A–4D form a detailed block diagram illustrating the structure of the timer of the preferred embodiment.
Figure 4B:
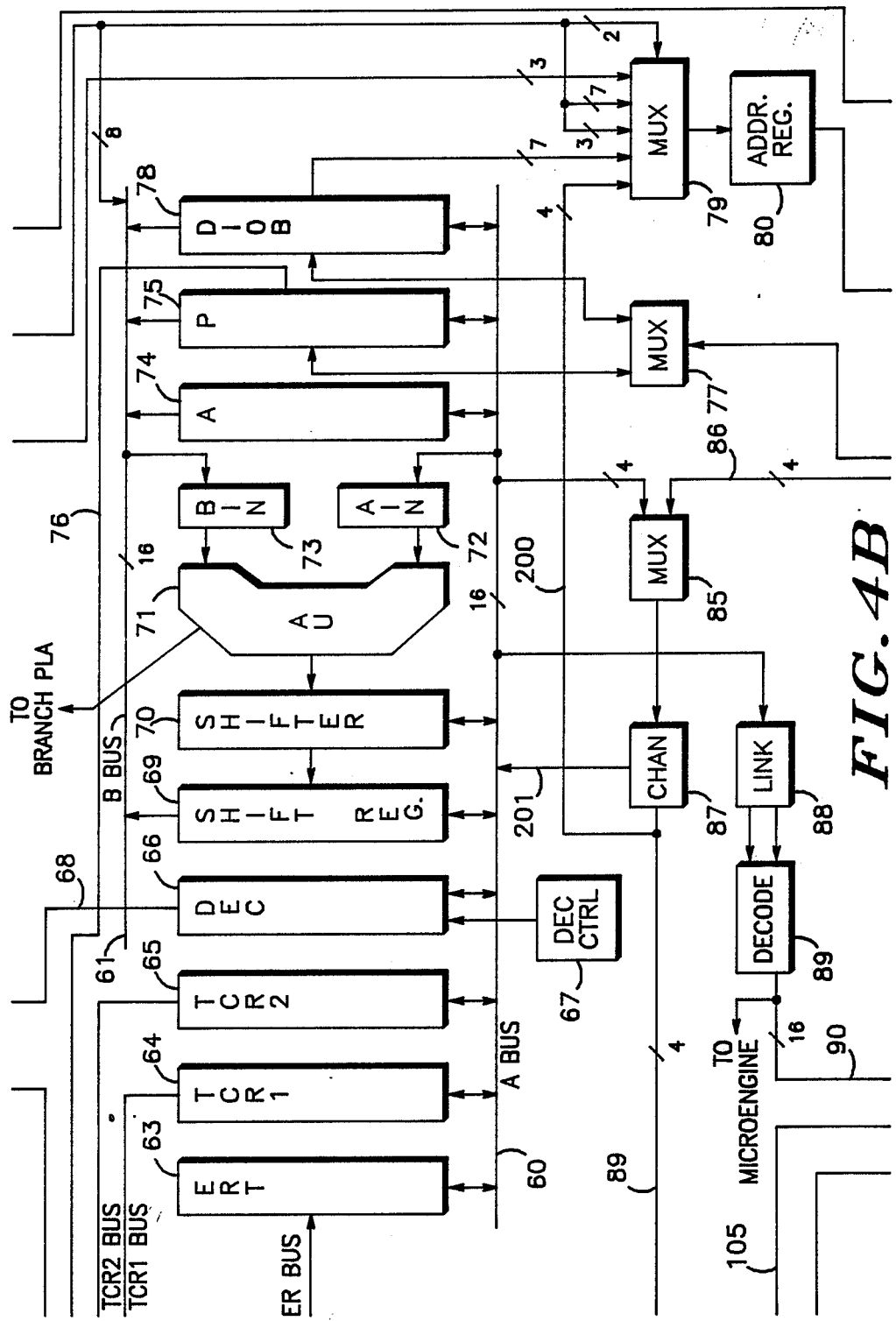
Figure 4C:
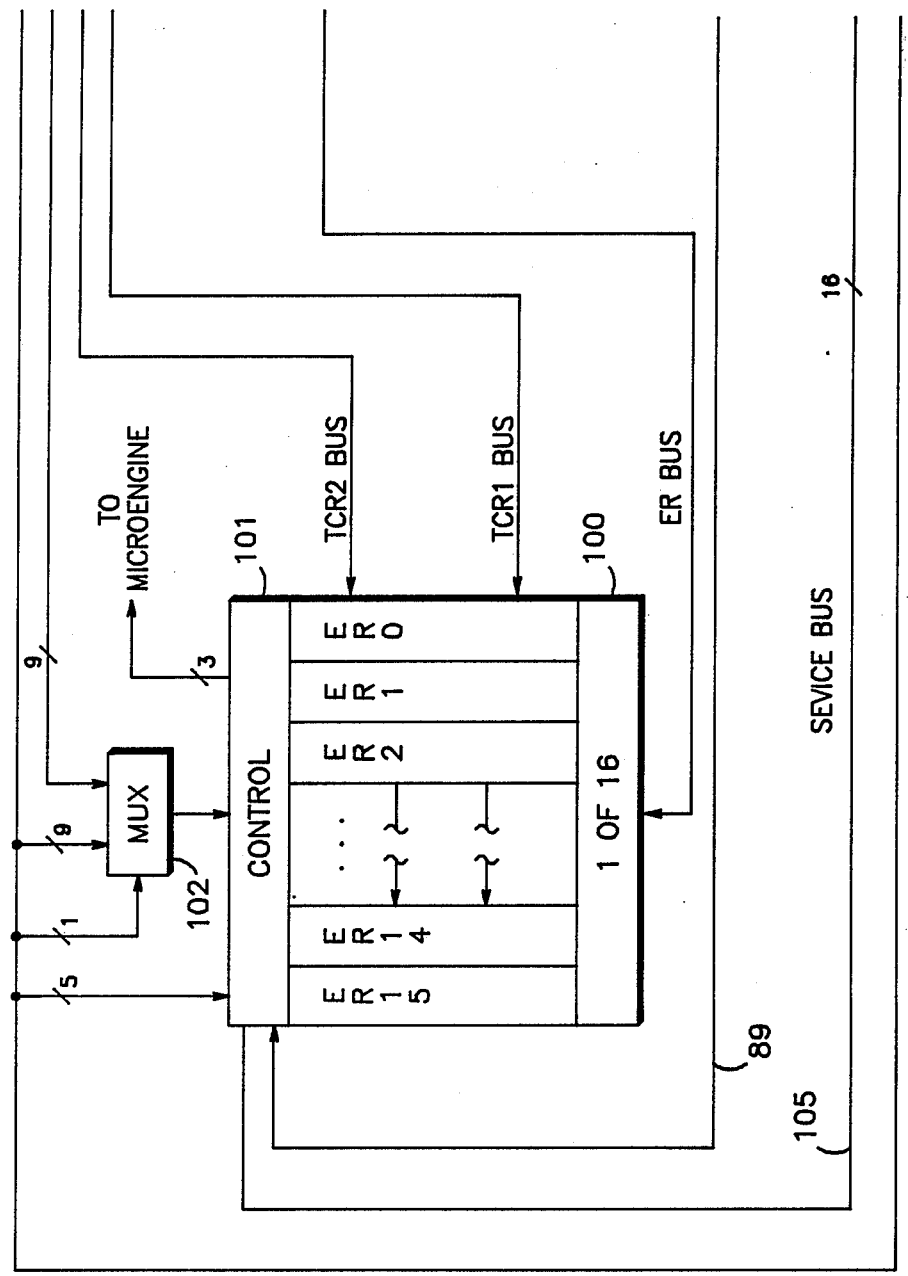

FIGS. 4A–4D, which inter-relate in the manner shown in FIG. 4E, illustrate the detailed structure of timer 15. Generally, FIG. 4A illustrates the microengine of service processor 20 (FIG. 3), FIG. 4B illustrates the execution unit of service processor 20, FIG. 4C illustrates the timer channel hardware and its interconnections to the remainder of the apparatus and FIG.

4D illustrates the bus interface, registers and service scheduler.

Referring first to FIG. 4A, the major functional components of the microengine are a priority encoder 30, an incrementor 31, a return address register 32, a multiplexor 33, a multiplexor control 34, a microprogram counter 35, a ROM control store 36, a multiplexor 37, a microinstruction register 38, a microinstruction decoder 39, a multiplexor 40, a branch PLA 41 and a plurality of flag registers 42. In general, a microinstruction address selected by multiplexor 33 from among a plurality of possible sources is loaded into microprogram counter 35 and is then supplied to ROM control store 36. The microinstruction selected by this address is provided by ROM control store 36 through multiplexor 37 to microinstruction register 38. Decoder 39 then decodes the contents of microinstruction register 38 and provides control signals throughout the service processor as required.

While microinstruction decoder 39 is illustrated as a single unit, the control signals from which are distributed throughout the remainder of the timer, one skilled in the art will appreciate that it may be advantageous to alter this scheme. Since the number of bits output from microinstruction register 38 is smaller than the number of control signals output from decode logic 39, it may be advantageous to distribute the output from microinstruction register 38 throughout the timer and provide multiple, distributed decoders in various locations. The trade-offs between saved signal routing and duplicative decode logic are complex design decisions which must be made on a case-by-case basis.

The emulation interface discussed above (reference numeral 17 in FIGS. 1 and 3) is seen in this view as comprising an emulation line 50, a memory cycle start line 51, a microinstruction address line 52 and a microinstruction line 53. When the emulation mode is in effect, as directed by the state of the signal on emulation line 50, the RAM will respond to addresses on line 52 to produce microinstructions on line 53. Multiplexor 37 selects these microinstructions instead of those supplied by ROM control store 36 and provides the RAM-produced microinstructions to microinstruction register 38. The state of emulation line 50 is controlled by the emulation mode control bit in the module configuration register and is, therefore, under the control of the host CPU. The memory cycle start signal is simply a timing signal derived from the system clock.

To the extent that an understanding of the detailed features and operation of the microengine illustrated in FIG. 4A is necessary to the practice of the present invention, FIG. 4A will be described more fully below.

Turning to FIG. 4B, the execution unit of the service processor is described. The execution unit includes two sixteen-bit bi-directional buses: an A bus 60 and a B bus 61. An event register transfer register 62 is bi-directionally connected to A bus 60. Similarly, timer count register #1 64 and timer count register #2 65 are bi-directionally connected to A bus 60. A decrementor 66 is bi-directionally coupled to A bus 60. In addition, decrementor 66 is connected to receive control inputs from a decrementor controller 67 and to provide outputs to, via line 68 multiplexor control 34 and microprogram counter 35 of FIG. 4A. A shift register 69 is bi-directionally connected to A bus 60 and is connected to provide outputs to B bus 61. Shift register 69 is connected to receive inputs from a shifter 70. Shifter 70 is bi-directionally connected to A bus 60.

Shifter 70 is also connected to receive inputs from an arithmetic unit (AU) 71. AU 71 receives inputs from two input latches Ain 72 and Bin 73. Latches 72 and 73 are connected to receive inputs from A bus 60 and B bus 61, respectively. AU 71 provides a number of condition code outputs to branch PLA 41.

A general purpose accumulator (A) 74 is bi-directionally connected to A bus 60 and is connected to provide outputs to B bus 61. A parameter pre-load register 75 is bi-directionally connected to A bus 60 and is connected to provide outputs to B bus 61. In addition, parameter pre-load register 75 is connected to provide outputs to the channel control hardware of FIG. 4C by means of line 76. Register 75 is also bi-directionally connected to a multiplexor 77.

A data input-output buffer (DIOB) register 78 is bi-directionally connected to A bus 60 and is connected to provide outputs to B bus 61. DIOB 78 is also bi-directionally connected to multiplexor 77. In addition, DIOB 78 is connected to provide outputs to a multiplexor 79. Multiplexor 79 is connected to provide outputs to a parameter RAM address register 80.

Figure 4D:
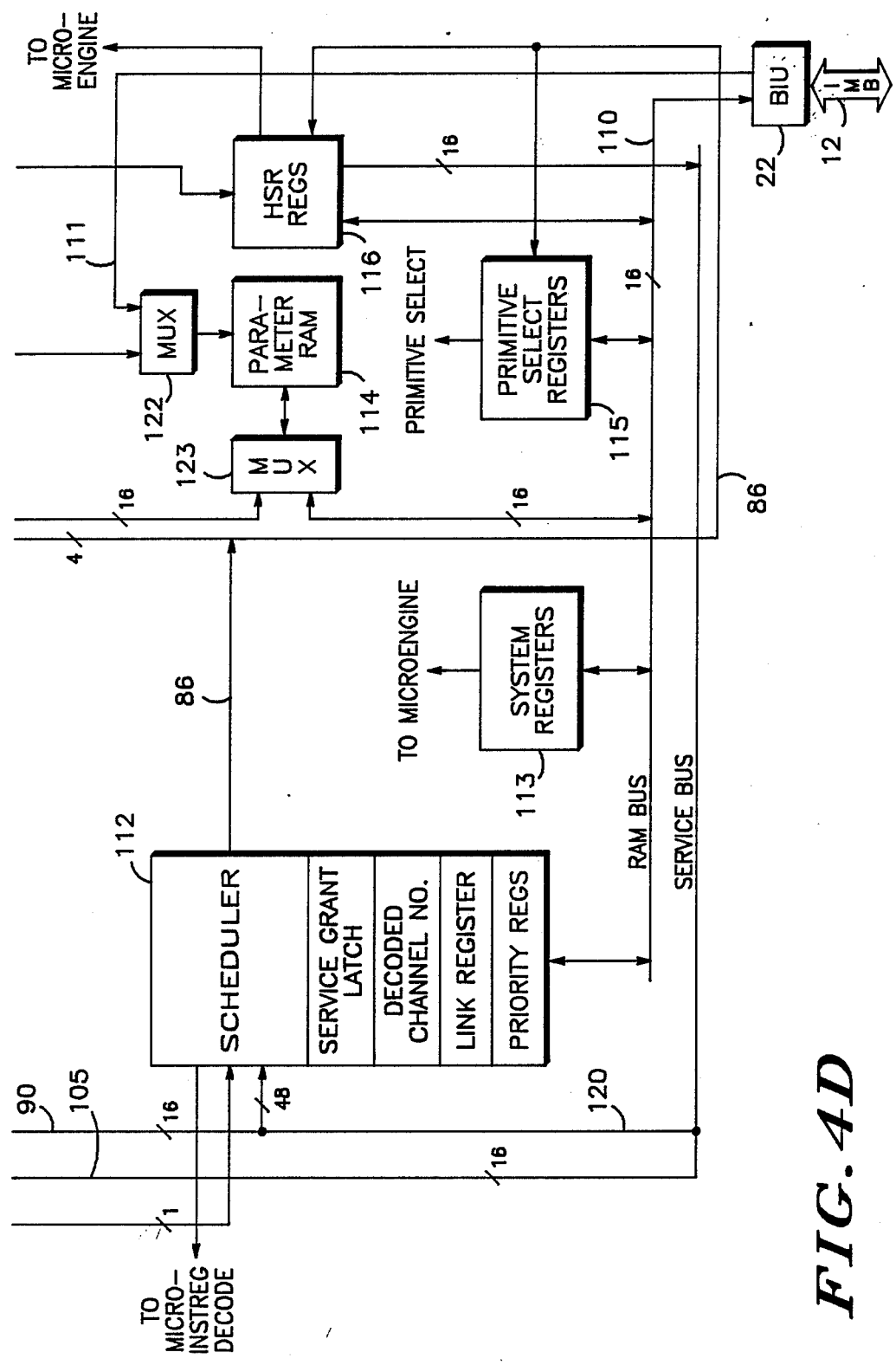

A multiplexor 85 is connected to receive inputs from A bus 60 and from line 86, which arises in the service scheduler of FIG. 4D. The output of multiplexor 85 is provided as an input to a channel register 87. Channel register 87 is connected to provide outputs to A bus 60 by means of line 201 and to the channel control hardware of FIG. 4C by means of line 89. It is by means of the contents of channel register 87 that the various control signals and ER bus cycles are appropriately directed in the channel control hardware illustrated in FIG. 4C to the particular channel currently being serviced. Because of the ability of the illustrated apparatus to change the identity of that channel during the execution of a service program, or primitive, the contents of channel register 87 will not always correspond to the contents of the decoded channel number register described above with respect to FIGS. 2A and 2B. The latter register contains the identity of the channel upon which execution of the currently executing primitive was begun, while channel register 87 contains the identity of the channel to which control signals are currently being directed. To the extent that this distinction is important to an understanding of the present invention, it will be described more completely below.

A link register 88 is coupled to receive inputs from A bus 60 and to provide outputs to a decoder 89. The four bits of link register 88 are decoded by decoder 89 to produce sixteen bits, each of which is associated with one of the timer channels. These sixteen bits are coupled to branch PLA 41 of FIG. 4A and to the service scheduler of FIG. 4D by means of line 90. Link register 88 provides the means by which the service processor can schedule service for any channel under microinstruction control, simply by writing the identity of the desired channel to link register 88. Link register 88 is distinct from the link register described above with respect to FIGS. 2A and 2B. Link register 88 contains the identity of the register for which a link service request, if any, is currently being initiated by the service processor. The link register described above with respect to FIGS. 2A and 2B simply contains a flag bit for each channel indicating that a link service request has been initiated, but not yet responded to.

To the extent that a detailed understanding of the features and operation of the execution unit illustrated in FIG. 4B is necessary to the practice of the present invention, FIG. 4B will be described more fully below.

Referring now to FIG. 4C, the channel hardware is illustrated. The detailed components of a single channel are illustrated and described with reference to FIG. 5. From the viewpoint of the remainder of the timer, the channel hardware appears as sixteen event registers, labelled here ER0–ER15, a one-of sixteen decoder 100 and a block of control logic 101. Each of the TCR buses is connected to each of the sixteen event registers. The ER bus, which provides bi-directional communication with ERT register 63 (FIG. 4B), is connected to decoder 100. By this means, values can be transferred between any one of the event registers and the execution unit illustrated in FIG. 4B. As is apparent, timer count values are transferred from the execution unit to the event registers to set up match events and from the event register to the execution unit in response to capture events.

Line 89 from channel register 87 (FIG. 4B) is connected to control logic 101 to indicate thereto the channel currently receiving service. Control logic 101 also receives a plurality of inputs, both directly and through multiplexor 102, from microinstruction decoder 39 (FIG. 4A). In addition, control logic 101 provides outputs to branch PLA 41 (FIG. 4A). Finally, a service bus 105 provides control logic 101 a means for communicating service requests from the various channels to the scheduler of FIG. 4D. Again, the function of the channel hardware is described in greater detail below.

Referring now to FIG. 4D, the host interface portion of the timer is illustrated. As illustrated above, BIU 22 provides the necessary slave-only interface to IMB 12, allowing the host CPU to access the registers of the timer. BIU 22 is bi-directionally connected to a RAM bus 110 and is connected to provide outputs to a parameter RAM address bus 111. The remainder of the apparatus illustrated in FIG. 4D comprises scheduler 112, system registers 113, parameter RAM 114, primitive select registers 115 and host service request registers 116, all of which are bi-directionally coupled to RAM bus 110.

Scheduler 112 comprises the means by which the sixteen timer channels are allocated the resources of the service processor. As illustrated, the two channel priority registers, the link register, the decoded channel number register and the service grant latch register (all described above with reference to FIGS. 2A and 2B) may be thought of as residing within scheduler 112 and are all bi-directionally coupled to RAM bus 110.

Scheduler 112 receives a single bit of input from microinstruction decoder 39 which indicates that service of a particular channel has been completed. This initiates the process by which scheduler 112 determines which of the pending service requests is to be next serviced. Scheduler 112 also provides a single bit of output to microinstruction decoder 39 to indicate that no channel is currently scheduled for service, also referred to as an "idle" condition.

Scheduler 112 receives inputs from a service bus 120 which comprises 48 bits made up of a concatenation of sixteen bits from line 105, sixteen bits from decoder 89 via line 90 and sixteen bits from host service request registers 116. These 48 bits indicate those channels for which the channel hardware itself is currently requesting service, those channels for which service is currently being requested by means of link register 88 and those channels for which service is being requested by means of host service request registers 116, respectively. Scheduler 112 accepts these inputs, considers the relative priority of the channels for which service is requested as represented by the values in the channel priority registers, and determines which channel is to be serviced next. A four bit designator of the selected channel is output via line 86 to multiplexor 85, primitive select registers 115 and host service request registers 116, among others.

As mentioned above, each channel has one of four priority levels assigned to it by virtue of the corresponding bits in the priority registers. The scheme by which scheduler 112 schedules the channels with pending service requests for service ensures that even a low priority channel will eventually receive service. This feature is important to ensuring that no timing functions are missed altogether due to the time required to service other functions. Among channels with the same priority level, scheduler 112 assigns service on a round-robin basis.

Each opportunity for scheduler 112 to select a new channel for service (i.e.: at least one service request is pending and no channel is currently being serviced) is referred to as a time slot boundary. The scheme used by scheduler 112 assigns four out of every seven available time slots to channels with their priority set to high, two out of seven to channels with their priority set to mid and one out of seven to channels with low priority. The particular sequence used is: high, mid, high, low, high, mid, high. If no channel of the appropriate priority level has a service request pending during at a time slot boundary, scheduler 112 passes to the next priority level according to the following scheme: high-to-mid-to-low; mid-to-high-to-low; and low-to-high-to-mid.

Within scheduler 112 there is a service request latch for each channel which is set whenever any type of service request is pending for that channel. This latch is cleared by scheduler 112 when a time slot is assigned to that channel and may not be re-asserted until the service has been completed. This implies that no channel may be assigned two consecutive time slots, unless there is an idle state between the slots and no other channels have service requests pending.

Among channels with equal priority, scheduler 112 ensures that all channels requesting service are serviced before any of them is serviced twice. The lowest numbered channel in a group of equal priority channels will be serviced first.

Of course, schemes for assigning priority among competing demands for access to limited processing resources are well known and vary widely. Many other such schemes could be substituted for that just described. The scheme disclosed is believed to be advantageous for timer systems because it provides assured service for even the lowest priority requestors.

Parameter RAM 114 comprises 6 parameter registers, each 16 bits wide, for each of the sixteen timer channels, for a total of 192 bytes of RAM. Parameter RAM 114 is "dual access" in the sense that both the host CPU and the service processor can read and write data therein, but only one of them may have access at one time. An address multiplexor 122 and a data multiplexor 123 select which of the service processor and the host CPU gains access. Arbitration logic which is not shown here actually determines which possible bus master will gain access. Address multiplexor 122 is coupled to receive addresses from address register 80 and from BIU 22 via parameter RAM address bus 111. Data multiplexor 123 is bi-directionally coupled to RAM bus 110 and to multiplexor 77. The methods by which addresses are generated by the service processor for accessing parameter RAM 114 are discussed in greater detail below, to the extent that they are relevant to the present invention. However, it should be noted that addresses may be generated either based directly on the current contents of channel register 87 (see FIG. 4B) or based on those contents as modified by the addition of some offset value. These addressing modes, in which the parameter RAM address is specified relative to the current channel, provide significantly increased flexibility in the creation of primitives intended for execution by the service processor.

Another important aspect of the design of parameter RAM 114 involves the problem of coherency. If the host CPU is in the process of writing several parameters into parameter RAM 114 for use by, say, channel 0, it is important that no service routine executed by the service processor be able to use those parameters after some, but less than all have been written. The same problem with multiple-byte exists in the opposite direction; i.e.: parameters being transferred from the service processor to the host CPU. There are a large number of different methods of handling coherency problems which are known in the art. For the sake of completeness, the coherency scheme used in the preferred embodiment is described in summary form, below.

One of the 16-bit words which make up parameter RAM 114, in this case the word designated as parameter register 5 of channel 0 (see FIG. 2B), is designated for use as a coherent data control register (CDC). Bit 15 of this register is used as a semaphore bit. Whenever either the service processor or the host CPU wishes to access parameter RAM 114, the semaphore bit is checked first and, if it is set, access to those locations which are used for coherent data transfer is held off until the semaphore bit is clear. When one of the possible bus masters wishes to initiate a coherent transfer, it first sets the semaphore bit, then executes the transfer, then clears the semaphore bit. It is left to the programmers writing programs for execution by both the host CPU and the service processor to see that this scheme is carried out.

Bit 14 is designated as a mode bit which indicates that either 3 or 4 parameters (each 16 bits) are to be transferred coherently. If 3 parameters are to be transferred, then the words designated as parameter registers 0-2 of channel 1 are used as the protected locations. If 4 parameters are to be transferred, parameter register 3 of channel 1 is also used.

Further details of the coherency scheme used in the preferred embodiment are not important here, because the problem and many of its possible solutions are well known to those skilled in the art.

Primitive select registers 115 comprise the four channel primitive select registers discussed above. These registers are bi-directionally coupled to RAM bus 110 and also receive an input indicative of the channel being serviced from line 86. The output of the channel primitive select registers is provided to the primitive select logic of the microengine.

Host service request registers 116 comprise the two host service request registers discussed above. Host service request registers 116 are bi-directionally coupled to RAM bus 110 and provide a sixteen bit output to service bus 120. As discussed above, host service request registers 116 receive an input from scheduler 112 which indicates the channel currently being serviced. In addition, host service request registers 116 receive an input from branch PLA 41 and provide outputs thereto.

The remainder of the registers not shown elsewhere in FIG. 4D are characterized simply as system registers and are shown as block 113. Included in this group are the host sequence registers, which provide inputs to branch PLA 41. The other registers, such as the module configuration register, the module test register and the phase interrupt enable register, provide outputs to portions of the timer logic not illustrated in this view, such as the interrupt generation logic.

To the extent that a detailed understanding of the features and operation of the host interface and scheduler portion illustrated in FIG. 4D is necessary to the practice of the present invention, FIG. 4D will be described more fully below.

As is apparent, the apparatus illustrated in FIGS. 4A–4D cannot possibly include each possible logical structure of a system as complicated as that being disclosed. However, the overall structure and function of the disclosed timer will be apparent to one of skill in the art from the apparatus described.

Figure 5:
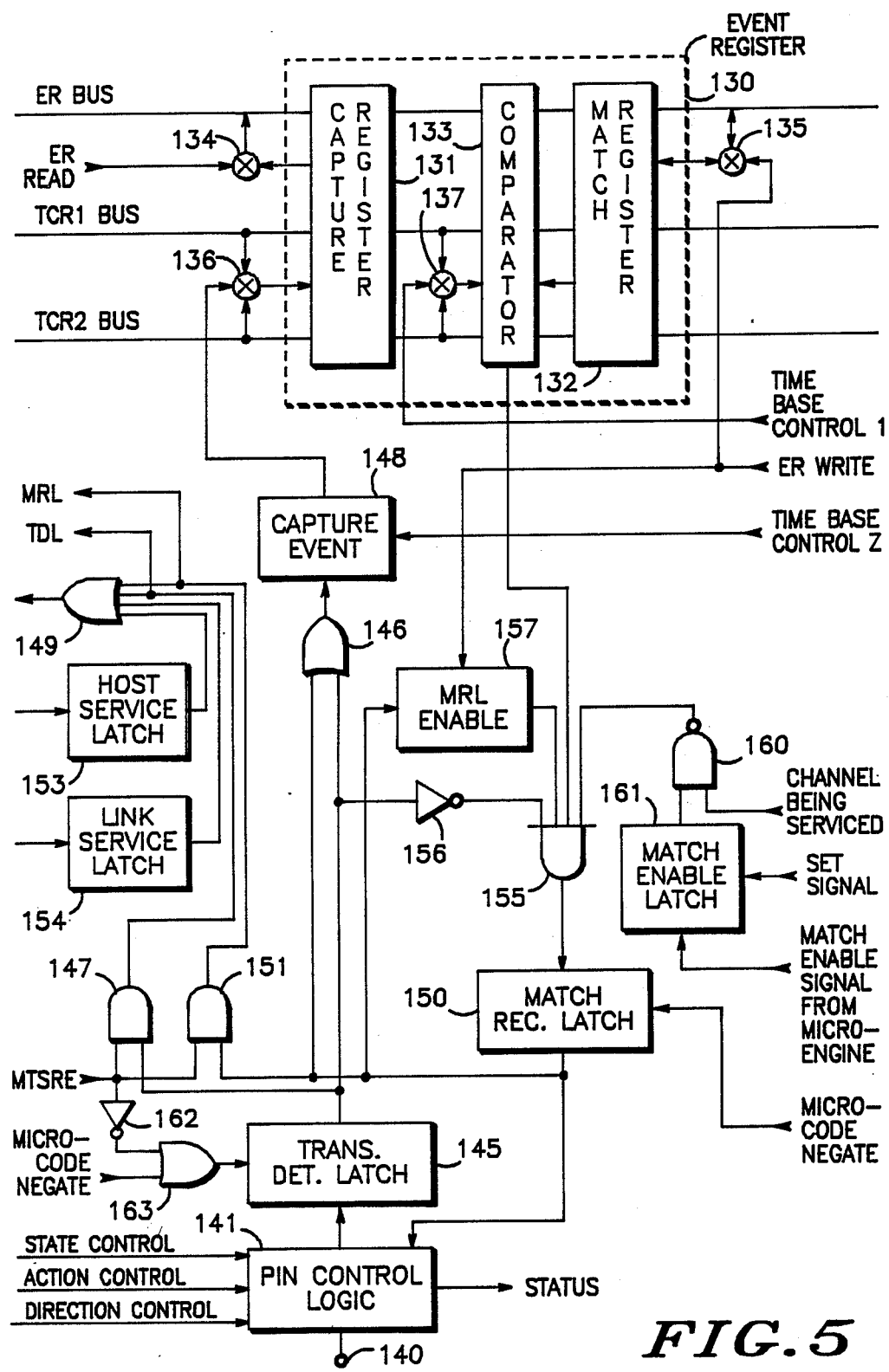
FIG. 5 is a detailed block diagram illustrating the structure of a timer channel according to the preferred embodiment.

Referring now to FIG. 5, the control hardware of a single timer channel is illustrated. In the preferred embodiment, each of the sixteen timer channels is absolutely identical to every other timer channel in every respect. This feature, which is one important aspect of the system feature referred to as "channel orthogonality", implies that any function which may be performed by one channel may also be performed by any other channel. The hardware illustrated in FIG. 5, therefore, except for those items specifically mentioned below, is duplicated for each of the sixteen timer channels of the preferred embodiment.

The event register 130 of each timer channel actually comprises a capture register 131, a match register 132 and a greater-than-or-equal-to comparator 133. Capture register 131 is coupled through a transmission gate 134 to the ER bus to allow the contents of capture register 131 to be loaded onto the ER bus. Match register 132 is bi-directionally coupled to the ER bus through transmission gate 135. Capture register 131 may be loaded from either the TCR1 bus or the TCR2 bus by means of transmission gate 136. A similar transmission gate 137 controls whether one input to comparator 133 is the TCR1 bus or the TCR2 bus. The other input to comparator 133 is always match register 132.

Turning to the opposite end of the apparatus illustrated in FIG. 5, the pin 140 which is associated with this timer channel is coupled to a block of pin control logic 141. Pin control logic 141 determines whether pin 140 is configured as an input timer pin or an output timer pin. When pin 140 is configured as an input timer pin, pin control logic 141 can be made to recognize positive-going transitions, negative-going transitions or either transition for purposes of triggering a capture event. When configured for output, pin control logic 141 can be programmed to produce a logic high level, a low low level or to change, or toggle, levels upon the occurrence of a match event. In addition, it is possible to force any of the three possibilities mentioned above regardless of whether a match event occurred. The service processor has control over pin control logic 141 through the state control (by means of which the pin state is "forced"), action control (by means of which the transition to be detected or level produced is selected) and direction control (by means of which the pin is configured as "input" or "output") inputs and can monitor the status thereof by means of the status output.

A transition detect latch 145 is coupled to receive an input from pin control logic 141. When the specified transition has been detected by logic 141 at pin 140, and if the pin is configured for input, latch 145 is set. Latch 145 may be cleared, or negated, by the service processor under microcode control. Under certain circumstances described further below, transition detect latch 145 is continuously negated.

A match recognition latch 150 is coupled to provide an input to pin control logic 141. If the contents of match register 132 "match" the state of a selected one of the TCR busses and if other logical conditions are met, match recognition latch 150 is set. When this occurs, and if pin 140 is configured for output, the selected transition is produced at pin 140 by pin control logic 141. Match recognition latch 150 is negated by the service processor under microcode control.

The output of transition detect latch 145 is coupled to inputs of a first OR gate 146 and a first AND gate 147. The other input of OR gate 146 is the output of match recognition latch 150. The output of OR gate 146 is coupled to capture event logic 148. Capture event logic 148 also receives a control signal indicative of one of the two counters (Time Base Control #2). The output of capture event logic 148 is coupled to transmission gate 136. When the output of OR gate 146 goes active, capture event logic 148 causes transmission gate 136 to load the current value of TCR1 bus or TCR2 bus, depending on Time Base Control #2, into capture register 131. As is apparent, a capture event can be triggered either by a transition detection or by a match event.

The other input of AND gate 147 is a control signal MTSRE (Match/Transition Service Request Enable) which is under control of the service processor. The output of AND gate 147 is a control signal referred to as TDL (Transition Detect Latch) and is coupled to the branch PLA of the service processor and also comprises one input of a second OR gate 149. The output of OR gate 149 may be thought of as the service request signal for the illustrated channel.

A second AND gate 151 has one input coupled to the output of match recognition latch 150 and a second input coupled to the MTSRE control signal. The output of AND gate 151 comprises a control signal referred to as MRL (Match Recognition Latch) and is coupled to the branch PLA of the service processor and is also an input to OR gate 149.

An inverter 162 has an input coupled to the MTSRE control signal and an output coupled to one input of an OR gate 163. The other input of OR gate 163 is the control signal from the service processor which negates transition detect latch 145. The output of OR gate 163 is coupled to the clear, or reset, input of transition detect latch 145.

The two inputs to OR gate 149 other than TDL and MRL are the outputs of a host service request latch 153 and a link service request latch 154. Neither of these is physically located in the timer channel hardware, but are more correctly thought of as residing in the scheduler. The output of OR gate 149, which may also be thought of as residing in scheduler 112 of FIG. 4D, is the service request signal for this channel.

A third AND gate 155 has its output coupled to the input of match recognition latch 150. One input of AND gate 155 is the output of an inverter 156 whose input is coupled to the output of transition detect latch 145. A second input of AND gate 155 is the output of a match recognition enable latch 157, which has inputs coupled to the output of match recognition latch 150 and to an event register write control signal. The ER write control signal also controls transmission gate 135. A third input of AND gate 155 is the output of comparator 133. A fourth input of AND gate 155 is the out of a NAND gate 160.

One input of NAND gate 160 is the output of a match enable latch 161. Match enable latch 161 is shared among all sixteen of the timer channels and is not properly thought of as being located within the control hardware of any one channel. The other input of NAND gate 160 is a signal indicating that the illustrated channel is currently being serviced by the service processor (i.e.: this signal is derived from the decoded output of channel register 87 of FIG. 4B). Match enable latch 161 is set by a set signal at the beginning of service of any channel by the service processor; i.e.: at each time slot boundary. Thus, the default state is that matches are inhibited for the channel being serviced. If a match enable bit in the entry point, or initial microprogram counter value, for the service program for the channel which is assigned to the time slot is set, match enable latch 161 will be cleared. The match enable signal from the microengine is also present whenever the microengine is idle, so that matches are not inadvertently inhibited for the channel whose identity happens to correspond to the contents of channel register 87 while the service processor is idle.

The detailed functions of match recognition enable latch 157 and match enable latch 161 will be further described below to the extent that they are relevant to the present invention. In summary, however, match recognition enable latch 157 serves to prevent multiple matches to a single match register value by disabling further matches until match register 132 is written to by the service processor and match enable latch 161 serves to disable matches from occurring on the channel currently being serviced unless such matches are specifically enabled by the primitive being executed.

An important feature of the channel hardware being described is the nature of comparator 133. As described above, it is a greater-than-or-equal-to comparator. This logical function is easily understood in the concept of an infinite number series such as the set of positive integers, but is less clear in the context of the modulo arithmetic implied by the use of free-running counters of finite length. Both of the TCRs count time as if they were single-handed clocks. The periods of these clocks depend on the frequency of their clocking inputs, but both have, in the preferred embodiment, $2^{16}$ distinct states. The states range from 0000 (hex) to FFFF (hex). Both counters simply "roll over" to a count of 0000 (hex) when incremented from a count of FFFF (hex). The conceptual difficulty arises when attempting to determine whether a particular match register value is greater than the current TCR value (ahead of the clock hand) or less than the current TCR value (behind the clock hand), since, in either case, the TCR value (the clock hand) will eventually overtake and pass the match register value.

The definition of greater-than-or-equal-to chosen for comparator 133 is as follows: the half of the clock face which immediately precedes the clock hand as it sweeps around is defined as being ahead of the current time and the other half of the clock face is defined as being behind the current time. More precisely: if the match register value can be obtained by adding a non-negative hexadecimal number less than or equal to 8000 (hex) to the selected TCR value (with the addition being performed according to normal modulo FFFF-plus-1 (hex) arithmetic), then the selected TCR value is said not to be greater-than-or-equal-to the match register value. No output is produced by comparator 133 as long as this relationship is true. If this relationship is not true, then the selected TCR value is said to be greater-than-or-equal to the match register value and comparator 133 asserts its output. If a match register value is written to match register 132 such that the selected TCR is value is already greater-than-or-equal-to the match register value, comparator 133 will assert its output immediately. This is important so that an output from pin 140 which is to be triggered by a match function, but which is "missed" because the service processor writes the compare value to match register 132 "too late", will be performed late, but will not be missed entirely.

Prior art timers universally use an equal-to comparator, so that the software written to use the timer must first check to see that the TCR value is not too great before writing the match value. The above-described functionality of the timer channel according to the present invention alleviates this problem.

It is possible to define the described greater-than-or-equal-to compare function with a value other than 8000 (hex). This number is chosen in the preferred embodiment because 8000 (hex) is one half of the full range of FFFF (hex) of the 16-bit counters being used. This, effectively, creates a "window" equal in size to half the full range of the TCR into which match values may be written without producing an immediate output. The particular number chosen for a given application will depend on the full range of the counters being used and the size of the desired window.

The disclosed apparatus provides sixteen fully orthogonal timer channels. Each channel is capable of performing all of the available timer functions and any function may be referenced to either of the two available timer reference signals. Further, the service scheduler is capable of assigning any channel to any of the available priority levels. These features are significantly enhanced by the inter-channel communication features of the service processor, however. Without these attributes of the service processor, the apparatus would still be orthogonal, but development of primitives for execution by the service processor would be significantly less flexible.

The principles of the inter-channel communication features may best be understood with reference to FIG. 4, and more particularly to FIG. 4B, which illustrates the portion of the service processor referred to as the execution unit. Those capabilities of the service processor of the preferred embodiment most closely associated with these features are its ability to change the channel which is currently being serviced without interrupting the execution of microcode (the change channel feature), the ability to generate a special type of service request to schedule service for another channel (the channel link feature) and the ability to perform these and other functions in a "relative mode" in which the channel being referred to is specified relative to the current channel, rather than by means of an absolute channel number (the channel relative mode feature).

In what may be thought of as a normal mode of operation, the service processor services the sixteen channels one at a time, in the sequence determined by scheduler 112. When the service processor is finished executing the microcode program associated with the current channel, an output of microinstruction decode logic 39 indicates this fact to scheduler 112. Scheduler 112 responds by placing on line 86 a four bit value specifying the next channel to be serviced. This value is routed through multiplexor 85 and stored in channel register 87. At the same time, the service processor determines which entry point, or starting address, to use in order to locate the first microinstruction of the primitive to be executed to service the new channel. Once this entry point has been determined, the service processor begins executing the desired primitive.

It is the contents of channel register 87 which determine which channel is currently being serviced. The contents of channel register 87 are provided via line 89 to control logic 101 of the channel control hardware. The value is decoded and used to identify which of the sixteen channels is to be acted upon by the control signals received from the service processor. The contents of channel register 87 are also provided via line 87 to multiplexor 79 to form a portion of the address for parameter RAM 114. This provides the mechanism by which the contents of parameter RAM 114 are logically divided into sixteen portions, each associated with one of the sixteen timer channels. Parameter RAM 114 corresponds to the channel parameter registers described above with reference to FIG. 2B.

The change channel feature and the link channel feature described above arise from the recognition that it may be necessary to utilize the resources of more than one channel in a cooperative fashion to solve certain timing problems. For instance, it may be desirable to respond to a capture event occurring at one channel to set up match events on a number of other channels. Thus, the service program for the channel which generated the capture must be able to directly or indirectly have an effect on those other channels.

The change channel feature provides a mechanism by which a service program being executed by the service processor can directly alter the number of the channel being serviced, without any interruption in the execution of the program. The mechanism involved includes multiplexor 85 and its connection to A bus 60. Multiplexor 85, which is controlled by the outputs of microinstruction decode logic 39, can load channel register 87 with a value taken from four of the sixteen bits of A bus 60. The source of the value may be any source from which data may be placed on A bus 60. Thus, one may include an instruction in a microprogram which directly changes the identity of the channel being serviced by loading channel register 87 with a new value. No interruption in the microinstruction sequence is necessary. Subsequent to the microinstruction which executes the channel change, all control signals will be directed to the new channel, rather than to the old one, and accesses to parameter RAM 114 will access those locations therein which are associated with the new channel.

The channel link feature provides the ability for a microprogram executing in response to a service request from one channel to generate a service request for any of the sixteen channels, including the current channel. The implementation of this feature involves link register 88 and its connections to A bus 60 and scheduler 112. As is the case with the change channel feature described above, one or more of the microinstructions executable by the service processor have the effect of loading link register 88 with a value obtained from A bus 60. In order to schedule a link service request for a channel, the microprogram simply executes one of these instructions, after first placing the desired value on the appropriate bits of A bus 60, of course. This value is supplied from link register 88 to decoder 89 and thereby to scheduler 112 via line 90 and is treated by scheduler 112 as is any other service request. As indicated, link register 88 is also coupled to the microengine. The fact that a channel has been scheduled for service as the result of a link service request is one of the channel conditions which are used as a portion of the entry point selection process and is also a branch condition available to branch PLA 41. As is the case with the change channel feature described above, the source of the value with which link register 88 is loaded may be any source from which data may be placed on A bus 60.

A particular use of the channel link feature provides for a particularly long sequence of microinstructions to be broken into several shorter sequences. The sequence can create a link service request to the same channel upon which it is currently operating and then terminate. When the channel is once again scheduled for service, the microprogram can continue. This mechanism would allow other channels requiring service to be scheduled sooner than they would be if the long sequence of microinstructions were executed all at once.

The channel relative mode feature has two aspects, the first of which is the ability to perform both the change channel and the link feature in a relative mode. In other words, the value loaded from A bus 60 into either channel register 87 or link register 88 may be derived from the present value in channel register 87 by adding an offset value. At least one microinstruction executable by the service processor contains encodings which direct that the contents of channel register 87 be placed on A bus 60 via line 201. Once this value is on A bus 60, it is available for manipulation by AU 71. In a typical example, the contents of an immediate bit field (i.e.: a portion of the microinstruction itself) would be added to the value obtained from channel register 87 and the result placed back on A bus 60. This manipulated value can then be loaded back into either channel register 87 or into link register 88 as described above. As is apparent, this will have the effect of performing either the change channel or channel link functions with the "destination" channel specified relative to the current channel, rather than absolutely. The ability to perform the change channel and channel link functions in this relative mode provides a significant increase in the flexibility of microprograms written for execution by the service processor. The microprograms can be written to be independent of any particular channel or group of channels. For instance, if a group of four contiguous channels are to be used for spark timing in an engine controller with either channel changes or links between them, the microcode can be written so as to be independent of which group of channels will be used.

Note that the channel link feature, when used in relative mode, makes the use of the self-linking feature described above as a mechanism for breaking up long microinstruction sequences significantly easier to use, since the microcode doesn't need to "know" the absolute channel number to which it is creating the link.

The second aspect of the relative mode is the ability to generate addresses to parameter RAM 114 in a relative fashion; that is, based on the current contents of channel register 87. Multiplexor 79 selects, under microcode control, among its various inputs to produce a seven bit address to place in register 80 for use in addressing parameter RAM 114. The address may comprise a single seven bit field obtained from the output of microinstruction decode logic 39 and which was simply a bit field in the microinstruction itself. Such an address may access any location within parameter RAM 114. Such an address is absolute in the sense that the channel whose parameter register is addressed is fixed by the value of the immediate field in the microinstruction.

The address produced by multiplexor 79 may also comprise a four bit field obtained from channel register 87 concatenated with a three bit field obtained from the output of microinstruction decode logic 39. In this case, the address is limited to accessing one of the six parameter register within parameter RAM 114 which are associated with the channel currently being serviced, with the particular register specified by the three bit field. This type of address is relative, since only the particular one of the six possible parameter registers need be specified in the microinstruction itself, with the identity of the channel being supplied by channel register 87. Thus, microcode can be written which accesses parameter register number 3, for instance, to obtain a particular value and this code may be executed on any channel without alteration.

The address produced by multiplexor 79 may also comprise the four bit channel register field concatenated with a three bit field obtained from the output of multiplexor 40. This mode is used only during the initial microinstruction of each sequence to pre-load a parameter into parameter pre-load register 75 and is not further relevant here.

The address produced by multiplexor 79 may also be obtained by the selection of seven bits obtained from DIOB register 78. To use this mode of addressing for parameter RAM 114, one first calculates the address and places it into DIOB register 78. This is accomplished by first placing the contents of channel register 87 onto A bus 60, then operating on that value to add a channel offset obtained as immediate data through B bus 61, or from some other source, and then providing the result to DIOB register 78. Next, this value is selected by multiplexor 79. An address produced by this method is also relative in the sense that the microcode is not specific as to the identity of the channel whose parameter is accessed. For instance, the microcode could specify that parameter register number 3 of the channel identified as the current channel plus 2 be accessed. This code would be executable on any channel.

As is apparent, the provision of channel relative addressing for parameter RAM 114 adds significantly to the flexibility of the service processor. In the spark timing example given above, for instance, it may be desirable to use a result generated by one channel as a parameter for use in calculation of event timing on the other channels. This could be done without channel relative addressing, but the resulting microprograms would be forced to operate on particular ones of the sixteen channels. With channel relative addressing, the microprograms can be written to be independent of which channels are used.

The specific features of the described embodiment which make the sixteen channels orthogonal are: (1) the ability to separately select either of the two available timer reference signals (the TCR values) for use with the match and capture functions; (2) that fact that all sixteen channels are identical in terms of their capabilities; (3) the ability to select the priority level which the scheduler will use in scheduling service for each channel independently of every other channel; and (4) the dedication of a pin to each channel. Features which contribute significantly to the flexibility of the described apparatus include the inter-channel communication features of the disclosed service processor, such as the change channel feature, the channel link feature and the channel relative mode. These features make the microcode written for execution by the service processor orthogonal, in the sense that the code becomes independent of the particular channel assigned to perform a particular function.

While the present invention has been shown and described with reference to a particular embodiment thereof, various modifications and changes thereto will be apparent to one skilled in the art and are within the spirit and scope of the present invention.

We claim:

1. An integrated circuit timer comprising:
   timer reference signal generating means for producing at least two timer reference signals; and
   a plurality of timer channels, each of said timer channels being identical and each comprising:
   input means for performing an input function, said input means being responsive to any of said at least two timer reference signals; and
   output means for performing an output function, said output means being responsive to any of said at least two timer reference signals.

2. An integrated circuit timer according to claim 1 further comprising:
   a plurality of terminals for connection of the integrated circuit to external circuits, a number of said terminals being equal to a number of said channels, each of said channels being coupled to one of said terminals; and
   control logic means coupled between each said terminal and each said channel.

3. An integrated circuit timer according to claim 2 further comprising:
   service processor means coupled to each of said plurality of channels for providing at least two control signals thereto, a first of said control signals selecting one of said at least two timer reference signals for said input means and a second of said control signals selecting one of said at least two timer reference signals for said output means.

4. An integrated circuit timer according to claim 3 wherein said input means further comprises:
   transition detection means within said control logic means for detecting a logical transition at said one of said terminals;
   capture logic means responsive to an output of said transition detection means and to said first of said control signals for producing an output; and
   capture register means responsive to said output of said capture logic means to store a value of said one of said at least two timer reference signals selected by said first of said control signals.

5. An integrated circuit timer according to claim 3 wherein said output means further comprises:
   match register means for storing, under control of said service processor, a value;
   comparator means coupled to said match register means and to said one of said at least two timer reference signals selected by said second of said control signals for producing an output when a predetermined relationship exists between said value stored in said match register and said one of said at least two timer reference signals; and
   means within said control logic for responding to said output of said comparator means for selectively generating an output signal at said one of said terminals.

6. An integrated circuit timer according to claim 3 wherein:
   each of said timer channels further comprises:
   service request means for producing a service request signal;
   and wherein:
   said service processor means further comprises:
   scheduler means for receiving said service request signals from each of said timer channels and for responding thereto according to a programmed priority scheme in order to provide that each of said plurality of channels is assigned a predetermined one of a plurality of priority levels by said priority scheme, each of said channels being assignable to each of said priority levels independent of the assigned priority level of any other channel.

7. An integrated circuit timer according to claim 1 wherein said timer reference signal generating means further comprises:
   clock means for receiving a system clock signal;
   a first free-running counter clocked by said system clock signal; and
   a second free-running counter clocked by one of said system clock signal and an externally-provided signal.

8. An integrated circuit comprising a data processor and a timer circuit, the timer circuit further comprising:
   timer reference signal generating means for producing at least two timer reference signals; and
   a plurality of timer channels, each of said timer channels being identical and each comprising:
   input means for performing an input function, said input means being responsive to any of said at least two timer reference signals; and
   output means for performing an output function, said output means being responsive to any of said at least two timer reference signals.

9. An integrated circuit according to claim 8 further comprising:
   a plurality of terminals for connection of the integrated circuit to external circuits, a number of said terminals being equal to a number of said channels, each of said channels being coupled to one of said terminals; and
   control logic means coupled between each said terminal and each said channel.

10. An integrated circuit according to claim 9 further comprising:
    service processor means coupled to each of said plurality of channels for providing at least two control signals thereto, a first of said control signals selecting one of said at least two timer reference signals for said input means and a second of said control signals selecting one of said at least two timer reference signals for said output means.

11. An integrated circuit according to claim 10 wherein said input means further comprises:
    transition detection means within said control logic means for detecting a logical transition at said one of said terminals;

capture logic means responsive to an output of said transition detection means and to said first of said control signals for producing an output; and capture register means responsive to said output of said capture logic means to store a value of said one of said at least two timer reference signals selected by said first of said control signals.

12. An integrated circuit according to claim 10 wherein said output means further comprises:

match register means for storing, under control of said service processor, a value;

comparator means coupled to said match register means and to said one of said at least two timer reference signals selected by said second of said control signals for producing an output when a predetermined relationship exists between said value stored in said match register and said one of said at least two timer reference signals; and means within said control logic for responding to said output of said comparator means for selectively generating an output signal at said one of said terminals.

13. An integrated circuit according to claim 10 wherein:

each of said timer channels further comprises:

service request means for producing a service request signal;

and wherein:

said service processor means further comprises:

scheduler means for receiving said service request signals from each of said timer channels and for responding thereto according to a programmed priority scheme in order to provide that each of said plurality of channels is assigned a predetermined one of a plurality of priority levels by said priority scheme, each of said channels being assignable to each of said priority levels independent of the assigned priority level of any other channel.

14. An integrated circuit according to claim 8 wherein said timer reference signal generating means further comprises:

clock means for receiving a system clock signal;

a first free-running counter clocked by said system clock signal; and a second free-running counter clocked by one of said system clock signal and an externally-provided signal.

15. A system comprising a host data processor and a timer, the timer further comprising:

first interface means for communication between the host data processor and the timer;

a plurality of timer channels each comprising at least one of means for performing an input timer function and means for performing an output timer function;

service processor means coupled to said plurality of timer channels for serially controlling said timer channels;

first memory means coupled to said service processor for storing instructions for execution by said service processor means;

second memory means coupled to said first interface means and to said service processor means for storing information under control of said service processor means and the host data processor; and scheduler means coupled to said plurality of channels and to said service processor means for receiving service request signals from said plurality of channels and for selecting one of said plurality of channels to be serviced by said service processor means.

16. A system according to claim 15 wherein the system further comprises a third memory means coupled to the host data processor for storing information under control of the host data processor and further comprising:

second interface means coupled to the third memory means and to said service processor means for providing, under control of the host data processor, access to the third memory means to said service processor means to provide that said service processor means executes instructions stored in said third memory means.

17. A system according to claim 15 wherein said plurality of timer channels are functionally identical to one another and wherein said scheduler means further comprises:

means responsive to information stored in said second memory means by the host data processor to assign one of a predetermined number of priority levels to each of said plurality of timer channels, the priority level assigned to any one of said plurality of channels being independent of the priority level assigned to any of the other of said plurality of channels.

18. A system according to claim 15 wherein said service processor further comprises:

channel register means for storing, under control of said scheduler means, an indication of the identity of one of said plurality of channels; and means for generating addresses for addressing said second memory means, a portion of each said address identifying one of said plurality of channels and said means for generating addresses being capable of deriving said portion from the contents of said channel register means.

* * * * *